United States Patent [19]

Masterton

[11] Patent Number: 4,716,579

[45] Date of Patent: Dec. 29, 1987

[54] PHASE CORRECTOR

[75] Inventor: John Masterton, Bishop's Stortford, Great Britain

[73] Assignee: STC PLC, London, England

[21] Appl. No.: 836,797

[22] Filed: Mar. 6, 1986

[30] Foreign Application Priority Data

Mar. 7, 1985 [GB] United Kingdom ............... 8505923

[51] Int. Cl.$^4$ .................. H03D 3/00; H03D 3/24
[52] U.S. Cl. ..................... 375/81; 375/88; 375/119; 375/120; 455/260; 329/124
[58] Field of Search ............... 375/42, 52, 77, 88, 375/118, 119, 120, 83, 81; 455/203, 260, 60; 329/124, 50

[56] References Cited

U.S. PATENT DOCUMENTS

| 4,105,975 | 8/1978 | Sanders et al. | 375/83 |
| 4,570,125 | 2/1986 | Gibson | 375/120 |
| 4,580,101 | 4/1986 | Lax | 455/260 |

Primary Examiner—Robert L. Griffin
Assistant Examiner—Marianne Huseman
Attorney, Agent, or Firm—Lee, Smith & Zickert

[57] ABSTRACT

A simple radio receiver for FSK signals is described in which the signals from the aerial are mixed in two high-gain mixers respectively with local oscillator signals in phase quadrature and at the signals' nominal center frequency. The outputs from the mixers are low-pass filtered to get the difference frequencies. The filter outputs are amplified and one applied to the D input of a D-type flip-flop to the clock input of which the other is applied. The flip-flop output gives the FSK modulation. It is highly desirable that the local oscillator's outputs, called Io and Qo should be in accurate phase quadrature, and the circuit described herein is intended to achieve this. To do this, the Io and Qo signals are applied to a quadrature phase sensitive detector (10) which, if the phase relation is wrong, gives an error signal. This is applied to an adjustable phase shifter (12) in one of the oscillator outputs, in this case the Qo output. Alternatively, the phase adjustment can be applied to both Io and Qo lines. The detector can be analogue, or digital, in which case it could be based on an EXCLUSIVE OR circuit.

1 Claim, 7 Drawing Figures

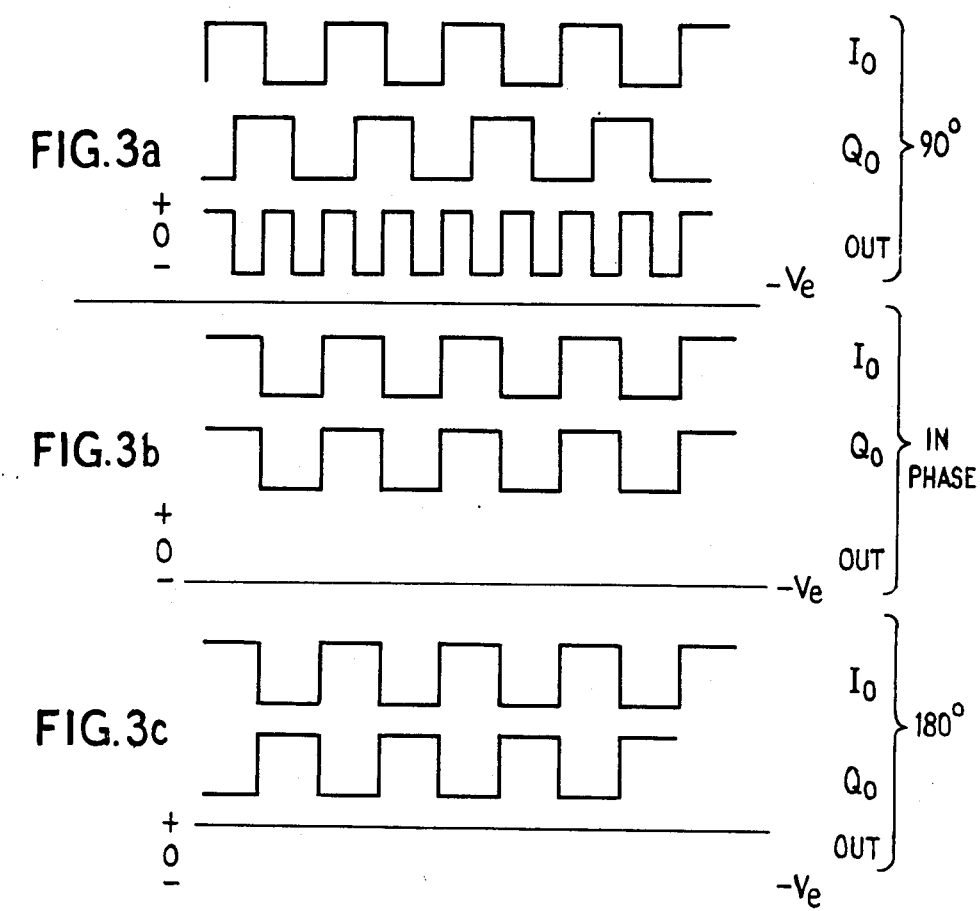
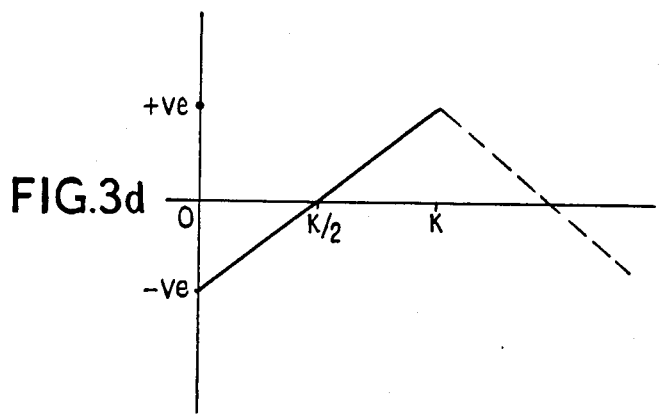

PHASE CORRECTOR

BACKGROUND OF THE INVENTION

The present invention relates to a phase receiver Such receivers are described in British patents No. 1530602 U.S. Pat. No. 4,193,034 (Vance), and U.S. application Ser. No. 790,606 (Masterson et al).

In the above mentioned U.S. Pat. No. 4,193,034, we have described a simple radio receiver for FSK signals, used in that case in a radio paging system. RF signals from the aerial are mixed in two high-gain mixers with local oscillator signals which are in phase quadrature and which are at the nominal centre frequency of the input signal. The outputs from the mixers are low-pass filtered so as to extract the difference frequencies with the width of the RF signal. Baseband signals from the filters are amplified in high-gain limiting amplifiers which deliver symmetrically limited outputs at logic level to a D-type flip-flop. One of the outputs is applied to the D input of the flip-flop and the other to its CK input, with the result that the signal appears at the Q output of the flip-flop.

The two channels, each including one of the mixers, in the above arrangement, are referred to as the I and Q baseband channels. In a zero IF radio with such channels, any quadrature error can have a disturbing effect on the fidelity of received or transmitted signals. An object of the invention is to provide a circuit in which such error is reduced or even eliminated.

SUMMARY OF THE INVENTION

According to the invention, there is provided a phase error correction circuit, in which two alternating current signals which should be in phase quadrature are applied to the inputs of a quadrature phase sensitive detector the output from which is an error signal if the phase relation between the inputs thereto is other than quadrature, in which the error signal thus produced is indicative of the magnitude and sign of any such difference, and in which phase adjusting means is responsive to the error signal to adjust the phase of one or both of said signals in a manner appropriate to the restoration of phase quadrature.

In view of the application for which the circuit to be described is intended, the invention also provides a radio receiver for frequency shift keyed signals on an RF carrier, which includes first and second paths to which the received radio signals are applied, each said signal path including a mixer circuit followed by a low-pass filter and a limiting amplifier stage, a local oscillator running at the carrier frequency, a first connection from the local oscillator via which the output thereof is applied direct to one mixer circuit, a second connection from the local oscillator to a quadrature phase shifter the output of which is applied to the other mixer circuit, so that the other mixer circuit receives the local oscillator output with a quadrature phase shift, a quadrature phase sensitive detector to whose inputs are applied the signal on the first connection from the local oscillator and the output of the quadrature phase shifter, the output from the detector being an error signal if the phase relation is incorrect, which error signal represents the magnitude and sign of the error in phase relation, phase adjusting means responsive to the error signal to adjust the phase of one or both of the locally generated inputs to the mixers in a manner appropriate to the restoration of the correct phase relation, and a D-type clocked flip-flop to the D input of which is applied the output of one of the limiting amplifier stages while the output of the other limiting amplifiers is applied to the clock input of the flip-flop, the output of the flip-flop being the signal modulated in frequency shift keyed manner on to the carrier.

BRIEF DESCRIPTION OF THE DRAWINGS

An embodiment of the invention will now be described with reference to the accompanying drawings, in which FIG. 1 indicates schematically an I-Q radio conversion scheme, as used in a zero IF receiver.

FIGS. 3a–3d are a set of waveforms illustrative of the characteristics of an EXCLUSIVE OR device.

DESCRIPTION OF THE PREFERRED EMBODIMENTS

Figure 1:
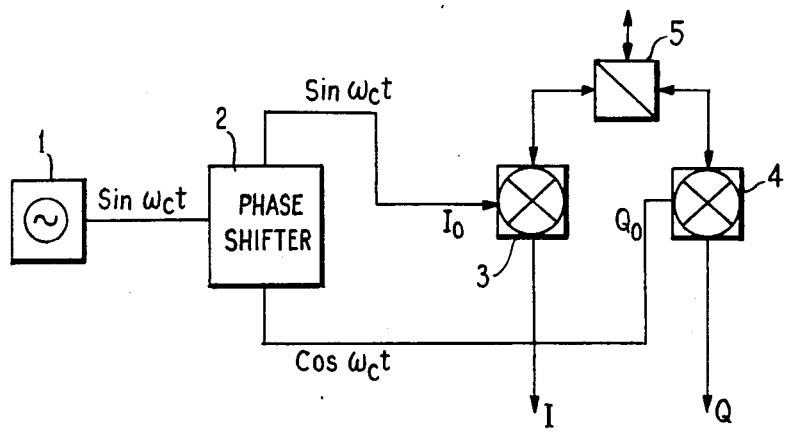

In a zero IF radio provided with I & Q baseband channels, for example as described in application Ser. No. 790,606, any quadrature error between the baseband channels can have an effect on the fidelity of received or transmittted signals. In systems used over a wide frequency range, it is important to provide a frequency independent phase shift. If the quadrature is provided by using local oscillator signals 90° phase shifted, as shown in FIG. 1, it is possible to measure, and correct for, any deviation from the correct phase shift. This shows the output of the oscillator 1 applied to a phase shifter 2 which produces two quadrature outputs Io and Qo. These are applied to the mixers 3 and 4 to which the signal being handled is applied from a source 5, usually an aerial. The output signals I and Q thus produced are thus available for further processing.

Figure 2:
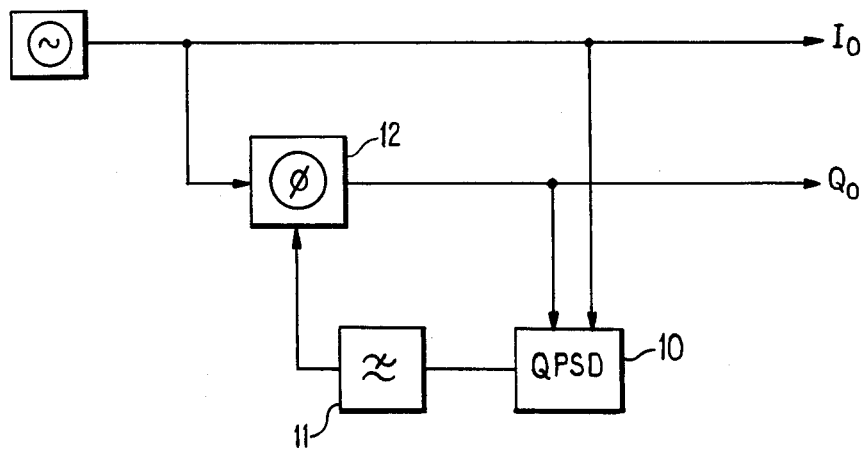
FIG. 2 is a simplified block schematic of a phase error circuit embodying the invention.

In the circuit shown in FIG. 2, an error signal proportional to the deviation from 90° phase shift is fed back to a phase shifter. Provided the phase shifter can take up a 90° phase shift at the frequency in question, and the phase detector output is stable when the inputs are in quadrature, the system will stabilize.

In this circuit, the Io and Qo signals are applied to the inputs of a quadrature phase sensitive detector 10, which gives an error signal as its output if there is any phase difference other than 90° between Io and Qo. This error signal is applied via a low pass loop filter 11 to a phase shifter 12, which varies the phase of the signal Qo to return the phase difference to 90°. Alternatively, the phase shifter could be in the Io line, or in both lines with suitable adjustments as will be seen below.

The object of the circuit just described is to provide accurate Io and Qo signals for mixing with the RF input on receive, or baseband signals on transmit. Referring to FIG. 2, the phase error, e, is measured by the quadrature phase sensitive detector 10, i.e. a phase detector whose output is stable when the inputs are in quadrature. One such device is a linear multiplier.

The desired outputs are:

$$Io = A \sin w_c t \quad (1)$$

$$Qo = A \cos w_c t \quad (2)$$

If an error of Δ is assumed to be present on (2), then $$Qo = A \cos(w_c t + \Delta(t)) \quad (3)$$

If the two channels are multiplied, then $$e = \frac{A^2}{2}[w_c t + (w_c t + \Delta(t))] + \frac{A^2}{2}\sin(w_c t - [w_c t + \Delta(t)]) \quad (4)$$

for small values of $\Delta$, $\sin \Delta \simeq \Delta (t)$ so using this approximation and filtering $$e = \frac{A^2}{2} \quad (5)$$

Obviously, any amplitude imbalance between the channels affects the scaling factor. If the inputs to the multiplier are amplitude limited to the same value, the term in A can be ignored.

An alternative technique is to use a digital phase detector, where pulse signal edges are compared in place of the QPSD in block 10 of FIG. 2. One such device is the EXCLUSIVE OR gate, characteristics of which are shown in FIG. 3. An EXCLUSIVE OR gate has not been specifically described as such devices are well known to those skilled in the art.

When the inputs Io, Qo are in phase quadrature, as shown in FIG. 3 (a), the output is a waveform at twice the input rate, with a 50% duty cycle. As the input moves away from quadrature, the duty cycle varies. At the extremes (FIG. 3 (b) and (c)), the output is either fully negative (in phase) or fully positive (anti-phase). The transfer characteristic is thus as shown in FIG. 3 (d).

When the output from the detector is filtered, using a filter providing the correct loop characteristic, an error voltage results, which is used to provide the control of the phase shifter.

An advantage of this technique is that the phase error can be measured at the point at which matching is critical, and correction applied by a loop. This removes the need for accurate absolute calibration from any part of the system other than the phase detector inputs.

Advantages of this technique over measurement of the phase error in the I-Q channels, as in the system of application Ser. No. 790,606, is that it is modulation independent, so the measurement is performed at the RF frequency, so that filtering may be simplified, and there is a consequent decrease in correction or adaptation time.

The phase shift itself can be applied by any means which will enable the system to take up a 90° shift at the measurement point. A 90° shift can be applied in one channel, as shown in FIG. 2. Alternatively, 45° phase shift could be applied between the channels (giving 90° relative phase difference) with one channel having a variable element.

In addition to use as part of a system in which there may be a requirement for remote measurement; it is feasible to provide a 90° phase shifting component which would measure the phase shift at its output ports and correct for any error. This would provide an accurate subsystem, removing the need for accurate trimming of active and passive components within the phase shifter.

Figure 4:
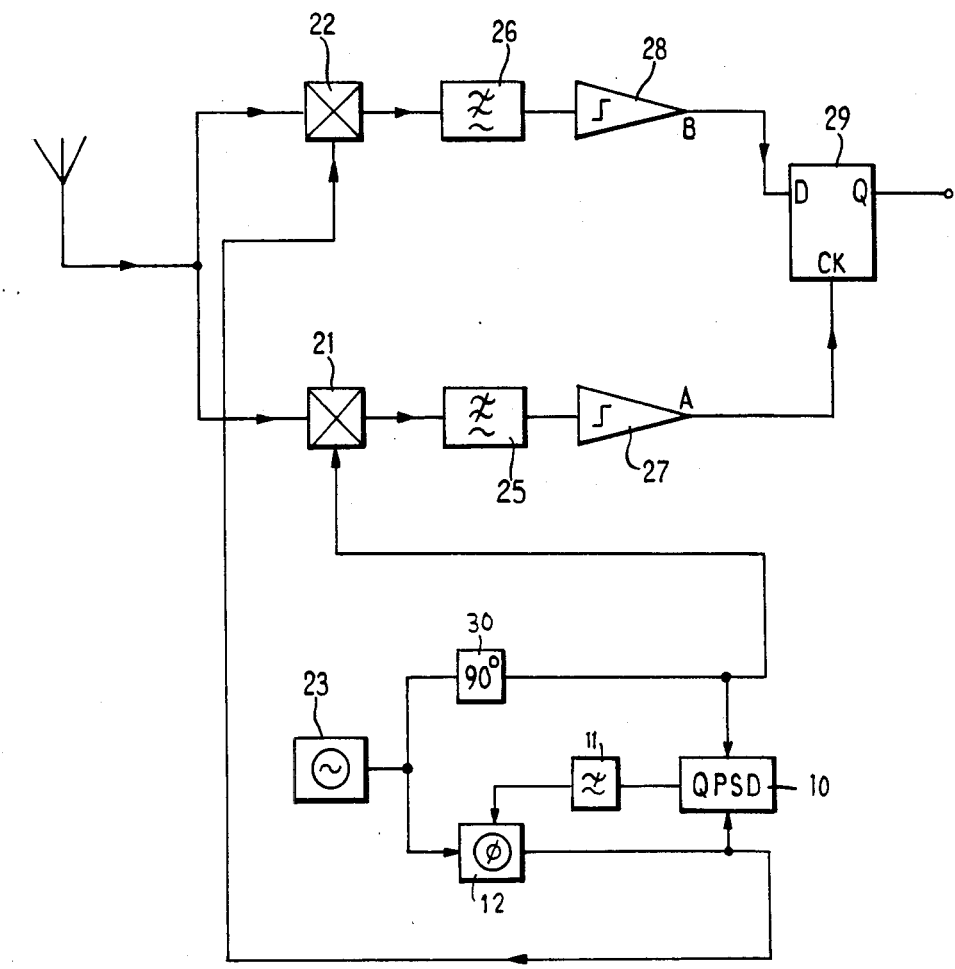
FIG. 4 is a block schematic showing how a circuit such as that of FIG. 1 is applied to a receiver.

In FIG. 4, the signal from the aerial is split and applied to two mixer circuits 21 and 22. The local oscillator 23 applies the quadrature signals to these circuits 21 and 22, and is of the same type as that shown in FIG. 1, above. This is done via phase correction circuitry of the type described above with reference to FIG. 2. The mixer circuits 21 and 22 respectively feed low-pass filters 25 and 26, and these in turn feed two limiting amplifiers 27 and 28. The output from the amplifier 27 is fed to the clock input CK of a D-type clocked flip-flop 29 the D-input of which is fed with the output from the amplifier 28.

The Q output of the flip-flop is the desired signal. The phase quadrature relationship is maintained by circuitry such as FIG. 2, and this includes a phase shifter 12, low pass loop filter 11 and QPSD block 10. These are all connected together, and function in the same manner, as in the circuit of FIG. 2. There is also a 90° phase shifter 30 between the oscillator 23 and the mixer circuit 21.

While I have described above the principles of my invention in connection with specific apparatus, it is to be clearly understood that this description is made only by way of example and not as a limitation to the scope of my invention as set forth in the objects thereof and in the accompanying claims.

I claim:

1. A radio receiver for frequency shift keyed signals on an RF carrier, which comprises first and second paths to which the received radio signals are applied, each said signal path including a mixer circuit followed by a low-pass filter and a limiting amplifier stage, a local oscillator running at the carrier frequency, a first connection from the local oscillator via which the output thereof is applied directly to the mixer circuits of the first of said paths, a second connection from the local oscillator to a quadrature phase shifter the output of which is applied to the mixer circuit of the second of said paths, so that the second mixer circuit receives the local oscillator output with a quadrature phase shift with respect to the first path, a quadrature phase sensitive detector to whose inputs are applied the signal on the first connection from the local oscillator and the output of the quadrature phase shifter, the output from the detector being an error signal if the phase relation is incorrect, which error signal represents the magnitude and sign of the error in phase relation, phase adjusting means responsive to the error signal to adjust the phase of one or both of the locally generated inputs to the mixers in a manner appropriate to the restoration of the correct phase relation, and a D-type clocked flip-flop to the D input of which is applied the output of one of the limiting amplifier stages while the output of the other limiting amplifiers is applied to the clock input of the flip-flop, the output of the flip-flop being the signal modulator in frequency shift keyed manner on to the carrier.

* * * * *